F. R. SUTTON & W. O. SUTTON.
Harvester-Cutters.

No. 141,298. Patented July 29, 1873.

Witnesses.
E. Wolff
Sedgwick

Inventor.
F. R. Sutton
W. O. Sutton
Per
Attorneys.

UNITED STATES PATENT OFFICE.

FREDERICK R. SUTTON AND WILLIAM O. SUTTON, OF WELLINGTON, ILLINOIS.

IMPROVEMENT IN HARVESTER-CUTTERS.

Specification forming part of Letters Patent No. 141,298, dated July 29, 1873; application filed May 24, 1873.

*To all whom it may concern:*

Be it known that we, FREDERICK R. SUTTON and WILLIAM O. SUTTON, of Wellington, in the county of Iroquois and State of Illinois, have invented a new and useful Improvement in Cutters of Mowers and Reapers, of which the following is a specification:

Our invention consists of independent ledger-plates for the cutters of mowers and reapers, secured to the fingers by a lip at each rear corner turned down on the edge of the finger, and a bar above extending along the whole series, and secured detachably to the front edge of the finger-bar, so as to be readily taken off to remove the plates for sharpening them. At the other ends the plates are secured by a notch in the end, and a notch or slot in the finger, as in other cases.

Figure 1:
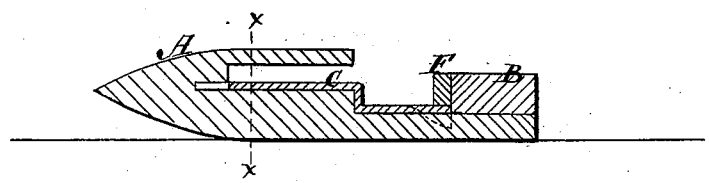
Figure 2:
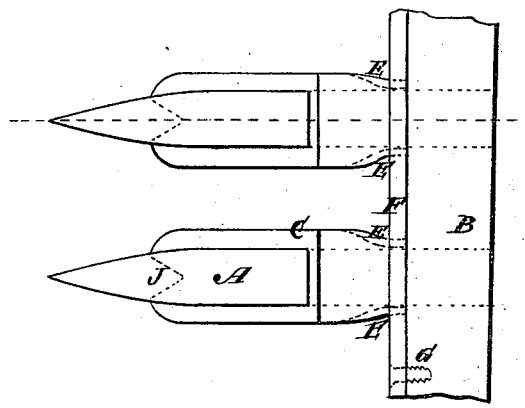
Figure 3:
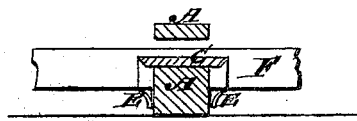

Figure 1 is a sectional elevation of a finger, ledger-plate, cutter-bar, and the bar employed for securing the ledger-plates. Fig. 2 is a plan view of a couple of fingers and edge plates, and a section of the finger-bar and the fastening-bar; and Fig. 3 is a section of Fig. 1 on the line $x\ x$.

A represents the fingers, and B the bar to which they are attached. C represents the ledger-plates, which butt against the front edge of the bar B, and are turned down at each corner, E, against the sides of the fingers immediately in front of bar B, and held fast thereon by the bar F placed above them, and fastened by screws G to said bar B, so that it can be readily taken off and put on to remove the ledger-plates for sharpening them.

It will be observed that the bar F forms the back wall of the race for the cutter-bar. At the other end the said plates are notched, as indicated by the dotted lines J, Fig. 2, and fitted in corresponding notches in the fingers.

This arrangement is much more compact, and the fastening-bar is not so much in the way as when arranged in the top of the finger-bar.

Having thus described our invention, we claim as new and desire to secure by Letters Patent—

The ledger-plates, detachably secured to the fingers by the lips E and bar F, the bar being secured to the front edge of the finger-bar by screws, and the plates being secured at the front ends, substantially as specified.

FREDERICK R. SUTTON.
   WILLIAM O. SUTTON.

Witnesses:
 K. DOOLEY,
 HENRY MOORE.